United States Patent [19]

Staron et al.

[11] Patent Number: 4,686,653

[45] Date of Patent: Aug. 11, 1987

[54] METHOD AND DEVICE FOR MAKING GEOPHYSICAL MEASUREMENTS WITHIN A WELLBORE

[75] Inventors: Philippe Staron, Mennecy; Pierre Gros, Buc, both of France

[73] Assignee: Societe Nationale Elf Aquitaine (Production), Courbevoie, France

[21] Appl. No.: 678,119

[22] Filed: Dec. 4, 1984

[30] Foreign Application Priority Data

Dec. 9, 1983 [FR] France ................. 83 19727

[51] Int. Cl.$^4$ .................. G01V 1/00; G01V 1/40; E21B 4/18
[52] U.S. Cl. .................... 367/25; 181/102; 73/151; 175/99
[58] Field of Search ............ 166/100; 175/97, 98, 175/99; 367/25; 181/102; 324/323; 73/151

[56] References Cited

U.S. PATENT DOCUMENTS

| 2,651,027 | 9/1953 | Vogel | 181/102 X |
|---|---|---|---|
| 2,946,578 | 7/1960 | Smaele | 175/99 |
| 3,690,164 | 9/1972 | Gabillard et al. | |
| 3,827,512 | 9/1974 | Edmond | 175/99 X |
| 3,876,971 | 4/1975 | Wuenschel | 181/102 X |
| 3,883,841 | 5/1975 | Norel et al. | 181/102 X |
| 4,114,721 | 9/1978 | Glenn | 181/102 X |
| 4,130,816 | 12/1978 | Vogel et al. | 181/102 X |
| 4,325,259 | 4/1982 | Willertz | |

FOREIGN PATENT DOCUMENTS

| 1169871 | 1/1959 | France . |
|---|---|---|
| 1193383 | 5/1970 | United Kingdom . |

Primary Examiner—Thomas H. Tarcza
Assistant Examiner—Tod R. Swann
Attorney, Agent, or Firm—Holman & Stern

[57] ABSTRACT

A method and device for making geophysical measurements in a wellbore comprising a measuring string of a plurality of measuring tools displaced along a borehole wall connected to a surface control unit by a traction system including a cable, guide pulley, connection head and junction box. The measuring tools are displaced at a relative velocity which is equal and opposite to the absolute velocity of the traction system in order to reduce the absolute velocity of the measuring tools to zero during measurement periods. The relative velocity of the tools is in the same direction as the absolute velocity of the traction system between measurement periods, with the result that the absolute velocity of the measuring tools during these periods is higher than the absolute velocity of the traction system.

16 Claims, 7 Drawing Figures

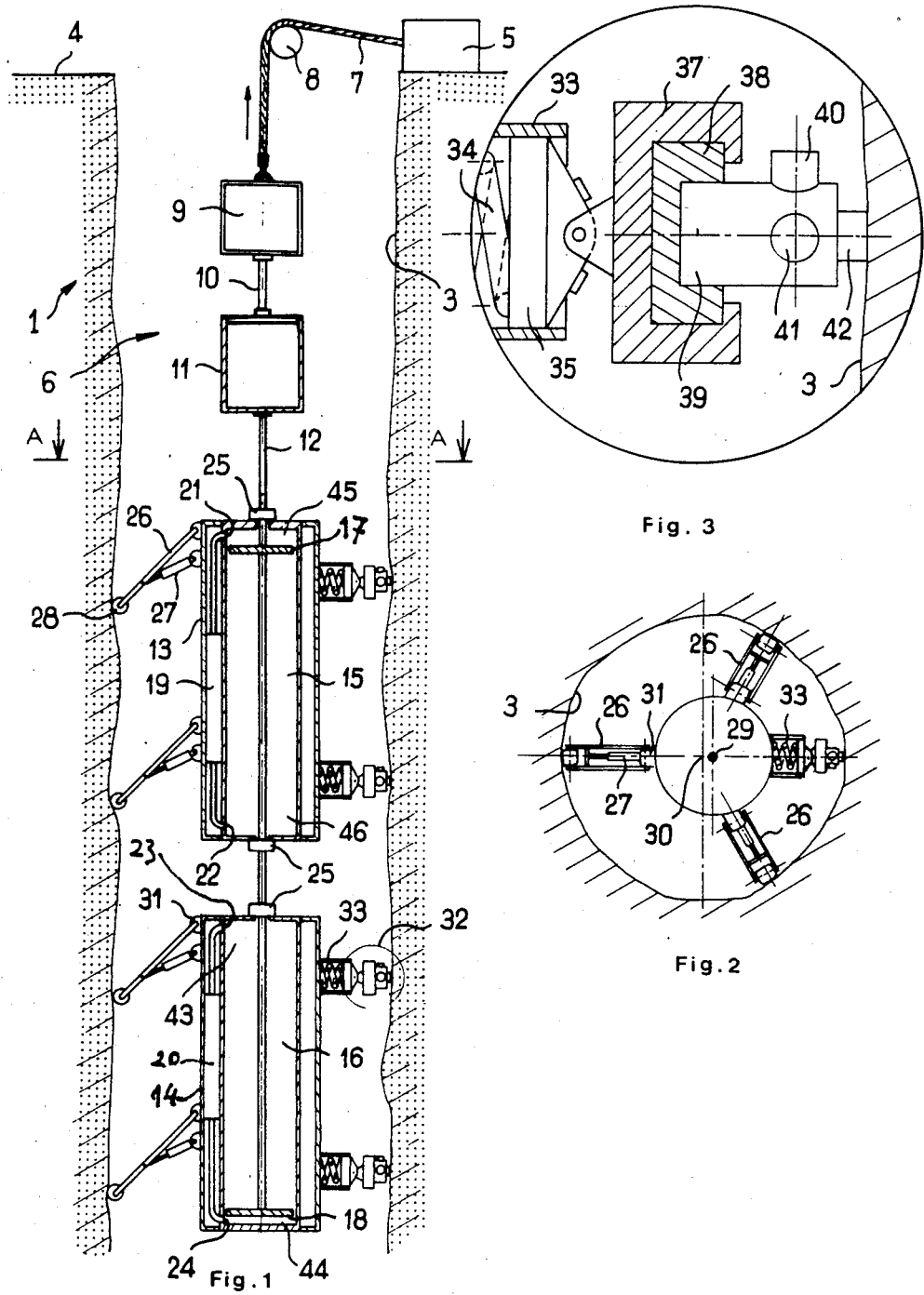

METHOD AND DEVICE FOR MAKING GEOPHYSICAL MEASUREMENTS WITHIN A WELLBORE

BACKGROUND OF THE INVENTION

1. Field of the Invention

The present invention relates to a method and a device for making geophysical measurements within a wellbore.

2. Description of the Prior Art

Measurements performed within a wellbore usually fall into two main types.

The first type of measurement known as ultrasonic measurement is carried out by means of a tool which is lowered into the borehole at the end of a cable. The tool comprises one or a number of transmitters and one or a number of receivers in addition to means for turning-on the transmitters at suitable instants, and means for transmitting the signals picked up by the receivers to the land surface for recording and processing.

In the majority of instances, ultrasonic measurements are performed during displacement of the tool, that is to say when the tool is moving within the wellbore. The relatively low rate of displacement of the tool within the wellbore (a few meters per minute) does not produce any background noise in the receivers.

The receivers employed are broadly designated as transducers and more specifically as hydrophones but these devices in fact have the function of sensors which are responsive to vibratory pressure.

The sensors receive compressional waves and possibly also parasitic waves derived from the compressional waves and generated by the inhomogeneities of the surrounding medium. The duration of each useful signal received on the sensor, after each transmission, is of the order of a few milliseconds, taking into account the frequency of the signals transmitted.

Since the measurements are made during displacement of the tool, the traction cable of the tool is therefore continuously under tension and is wound continuously around a drum, the rotation of which is controlled, for example, by displacement means located at the surface.

Many types of ultrasonic measurement tools in current use make it possible to exclude waves which propagate within the mass of the tool itself and to produce acoustic paths having cylindrical symmetry about the axis of the wellbore.

The second type of measurement relates to a vertical seismic profile, an oblique seisxic profile or else a wellbore seismic profile, this second type of measurement being completely different from the first type which was recalled earlier by way of reference.

In fact, in the case of petroleum prospecting, for example, it is necessary to determine the nature and characteristics of the subsurface strata which surround the wellbore. To this end, seismic energy is generated at the earth surface and not within the wellbore by means of a detonation (explosive charge), a suitable shock impact (falling weight), or else a vibrator in contact with the ground surface. This seismic energy produces waves which propagate within subsurface strata and are received on geophones and no longer on hydrophones. The geophones are designed as velocimeters which are responsive to vibrational velocity and placed either on the surface, in which case they receive the waves reflected and/or refracted by the different subsurface strata, or within the wellbore, but in this case they must imperatively be in direct contact with the wall of the borehole in contrast to ultrasonic measurement in which the sensors are usually immersed in the fluid which fills the borehole.

In all cases, the geophones or velocimeters are responsive to vibrational velocity and must permit determination of all the types of seismic waves generated by the energy emitted at the surface. In fact, direct mechanical coupling between the transmission means and the earth surface gives rise to all types of waves since the emitted seismic energy necessarily encounters inhomogeneities in the subsurface formations under exploration. In consequence, it can no longer be considered sufficient either to receive one particular wave among others on the geophone or geophones or to accept a scalar quantity. On the contrary, the geophones must necessarily receive all waves (compressional waves or transverse waves) and in all directions in which they propagate in order to be able to distinguish all the possible directions of vibrational velocities at the time of processing.

Giving due consideration to the transmission means employed and the object to be achieved, the frequencies transmitted are within the range of a few hertz to a few hundreds of hertz (5 to 500 Hz, for example) and the duration of the useful signal is of the order of a few seconds.

A final point worthy of note is that, in the second type of measurement referred-to in the foregoing and in contrast to ultrasonic measurement, measurements are performed during upward travel of the tool whilst the geophone or geophones remain stationary with respect to the borehole wall and are applied against the wall in order to ensure a satisfactory coupling.

Subsequent processing of the signals received by the geophones makes it possible to obtain useful information on the subsurface strata traversed by the waves from the shot point to the geophones.

A number of different techniques are open to selection. It is possible to place geophones at either uniform or non-uniform intervals along the wellbore and to process information recorded on the different geophones. It is also possible to use a tool which carries one geophone and is stopped at each appropriate level of the well-bore during each measurement.

In the second type of measurement, the major difficulty arises from the fact that, up to the present time, no effective method has yet been found for obtaining a satisfactory coupling of the geophone with the borehole wall.

One attempt has already been made to overcome this difficulty and is described in French patent No. 1,169,871. The device of this prior art comprises a tool fitted with a cylindrical element which serves to maintain a geophone assembly at the desired height within the borehole and prevents the geophone assembly from rotating with respect to the tool by means of a key-type connection. The geophone assembly comprises two arcuate blade springs disposed symmetrically on each side of the tool which is centered within the borehole, the springs being joined to each other by means of pivots mounted on an intermediate member which is attached to the tool body. One of the blade springs is applied against the borehole wall whilst the other blade spring carries substantially at its vertex a shoe which is pivotally mounted at the midpoint of the spring. The outer face of said shoe is in contact with the borehole wall opposite to the wall against which the first spring is applied. A geophone is then fixed on the inner face of the shoe and is connected by means of a conductor cable to the amplifying equipment located within the tool body.

A tool of this type constitutes a significant improvement over the technique which consists in placing geophones on the ground surface or at intervals along the borehole wall. However, it does not offer a complete answer to the problem of direct coupling with the borehole wall.

There is in fact no direct contact between the geophone and the borehole wall since the geophone is mounted on the inner face of the shoe. Although the shoe is perfectly rigid and the tension of the springs does not permit any displacement of the shoe in sliding motion along the borehole wall while a measurement is in progress, it is nevertheless a fact that the parasitic waves generated by the emitted energy and propagated within the tool body, within the blade springs and within the shoe are received by the geophone. This arises from the rigidity of the tool and the shoe as well as the blade springs although to a lesser degree.

A further drawback arises from the fact that, in the case of a given measurement, the geophone is oriented in only one direction and is therefore capable of detecting only one type of wave.

A further disadvantage which appears to present the most crucial problem is that the blade spring which carries the geophone has only one degree of freedom as determined in the direction of deflection of the spring. The structure of the spring and the developed applied stresses do not permit flexibility of the spring in all directions. In consequence, there is no effective decoupling between the mass of the tool and the mass of the geophone and of the associated shoe. Moreover, the tool has a considerable mass in comparison with that of the geophone assembly. This mass introduces a parasitic effect which is greater as the connection between the tool body and the geophone assembly has greater rigidity.

It should also be noted that, by reason of the rigid connection between the mass of the tool and the geophone, the fact that the mass of the geophone is smaller than that of the tool prevents useful vibration of the geophone on reception of the high frequencies of the transmission spectrum. These high frequencies are thus eliminated and the result thereby achieved is much the same as if the tool body and the relative flexibilities of the borehole walls constituted a filter for these high frequencies.

The device employed in the second type of measurement also comprises tool-displacement means which are attached to the tool by traction and suspension means.

Irrespective of the nature of the tool traction and suspension means just mentioned and regardless of whether these means are flexible or rigid, or whether they consist of a traction cable or a rod, the measurements are performed one after the other in succession up to the full height of the borehole and in the following manner, for example.

The measuring tool is lowered to the desired depth or level, whereupon said tool is placed in position and maintained stationary against the borehole walls by means of retractable arms. The measurements are then performed in respect of the borehole level considered.

Since the next measurements are to be made at a higher level, the tool must be displaced in the upward direction by folding-back the retractable arms and by actuating the traction means. Another positioning operation is then performed in exactly the same manner as the operation mentioned above.

It is readily apparent that these sequential measurements also entail the need for sequential operation of the traction and displacement means which must be stopped during measurements and displaced between measurements. In the case of the traction cable, an additional operation is necessary. This consists in re-tensioning said cable at the end of each series of measurements since the cable is released throughout the duration of the measurements in order to ensure seismic decoupling of the tool with respect to the surface displacement means.

In consequence, it is apparent that there is a relatively substantial loss of time throughout the entire sequence of operations, which includes a certain number of successive adjustments for the different tool positions within the borehole.

BRIEF SUMMARY OF THE INVENTION

The object of the present invention is to overcome the disadvantages mentioned in the foregoing and to propose effective decoupling between the traction and suspension means and the measuring tool, thereby ensuring that said means are continuously displaced during all the series of geophysical measurements and over the entire height of the borehole whereas the measurements are carried out either sequentially or non-continuously.

To this end, the present invention is directed to a method for making geophysical measurements within a wellbore of the type in which at least one measuring tool is displaced along the walls of said wellbore, said tool being connected to traction means, the speed of displacement of which is controlled by drive means placed at the ground surface. In accordance with a distinctive feature of the method, the tool is displaced at a relative velocity which is equal and opposite to the absolute velocity of the traction means in order to reduce the absolute velocity of the tool to zero during measurement periods. In accordance with another feature of the method, the relative velocity of the tool is in the same direction as the absolute velocity of the traction means between the measurement periods, with the result that the absolute velocity of the tool during these periods is higher than the absolute velocity of the traction means.

This permits seismic decoupling of the traction means with respect to the measuring tool by virtue of the fact that, when the measuring tool is in operation and stationary within the borehole (since it is locked in position between the borehole walls), the traction means are driven in a continuous manner and continue their movement either upwards or downwards, depending on whether the measurements are being performed from the bottom of the borehole or from the ground surface. When the measurements are completed, the measuring tool is displaced at a higher speed than the traction means in order to reduce all or part of the distance between them and to arrive at a different level within the borehole for the purpose of carrying out another series of geophysical measurements.

Thus, by means of the method in accordance with the invention, the measuring tool is displaced in a noncontinuous and/or sequential movement whereas the traction means are displaced in continuous motion.

In accordance with another distinctive feature of the invention, the device for carrying out the method outlined in the foregoing essentially comprises at least one double-acting jack in which the displacement of one moving portion is produced by the traction means which are displaced in continuous motion and in which the other moving portion produces the non-continuous displacement of said measuring tool, means being provided for controlling the relative displacement between the two moving portions of said jack.

In accordance with yet another distinctive feature of the invention, the device is of the type comprising transmission means which are capable of delivering transmission signals, and at least one geophone mounted on resilient members which are connected to said tool body. Said geophone has the function of detecting acoustic waves generated by said transmission signals after propagation within subsurface strata which exhibit characteristic elasticity at the level of the geophone. Means are also provided for recording and processing electric signals delivered by said geophone in response to the acoustic waves received. The device is distinguished by the fact that the resilient members consist of means which are flexible in at least two directions and are interposed between the geophone and application means connected to the tool body for applying said geophone against the borehole wall during each detection of said waves. The device is further distinguished by the fact that the elasticity of the flexible means is at least equal to the lowest elasticity of the subsurface stratum traversed by the borehole and that the frequency of resonance of the mass of the geophone with the flexible means is equal at a maximum to the frequency of resonance of said geophone mass with said lowest elasticity.

The connection of the geophone with the tool body by means which are flexible in at least one direction permits almost total decoupling of the mass of the tool body with respect to the mass of the geophone and consequently makes it possible to eliminate practically all the parasitic effects introduced into the measurements by the mass of the tool body. Furthermore, by virtue of this elastic connection, the geophone is capable of vibrating in the direction of the vibrational velocity component of the wave which it may receive.

BRIEF DESCRIPTION OF THE DRAWINGS

Other features of the invention will be more apparent to those skilled in the art upon consideration of the following description and accompanying drawings, wherein:

FIG. 1 is a schematic cross-sectional view of the device in accordance with the present invention within a wellbore which is shown in part;

FIG. 2 is a cross-sectional view taken along line A—A of FIG. 1;

FIG. 3 is an enlarged partial cross-sectional view of an elastic system within the encircled portion 32 of FIG. 1.

DETAILED DESCRIPTION OF THE INVENTION

Figures 4A, 4B, 4C, 4D:
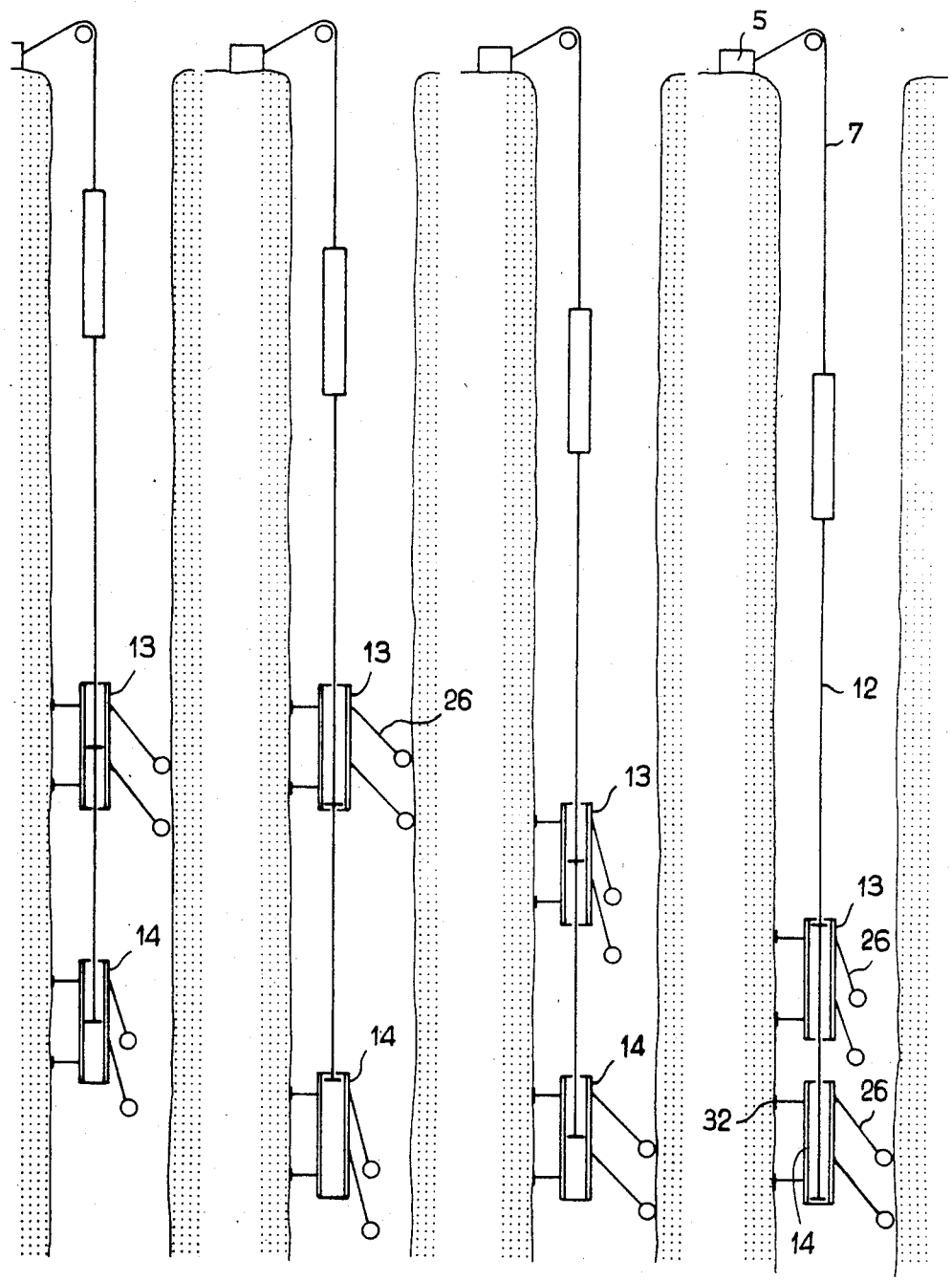
FIGS. 4a, 4b, 4c and 4d are schematic representations of the operation of the device within the wellbore.

The measuring device illustrated in FIG. 1 is intended to be lowered into a wellbore 1 which is delimited by its substantially cylindrical wall 3 and the ground surface 4. The wellbore 1 penetrates subsurface strata which are not specifically illustrated in the drawings and certain characteristics of which are to be determined.

Means for emitting seismic energy and displacement control means are placed on the ground surface 4. All these means form a control unit as represented schematically in the drawings in the form of a block 5.

The control unit 5 has the function of displacing traction means 6 in continuous motion. The traction means comprise a cable 7 guided by an idler pulley 8 and fixed at one end to a connection head 9 which is well-known to those versed in the art and marketed in particular by the Schlumberger Company. A rigid stem 10 joins the connection head 9 to a junction box 11 in which are housed all the electronic, hydraulic and mechanical accessories which are necessary for operation of the device.

A stem 12 of substantial length is attached to the base of the junction box 11 and passes through two measuring tool bodies 13 and 14. A cylinder 15 is provided within the first tool body 13 and a cylinder 16 is provided within the second tool body 14.

A first piston 17 is mounted on the stem 12 in stationarily fixed relation thereto and a second piston 18 is fixed at the lower end of stem 12. In consequence, cylinder 15 and piston 17 constitute a first double-acting jack which is integrated in the tool 13 and cylinder 16 and piston 18 constitute a second double-acting jack which is integrated in the tool 14.

The fluidic control circuits and other operating members of said jacks have not been shown since they are well-known to those versed in the art. Only two hydraulic ducts 19 and 20 are shown in the drawings, the duct 19 being assigned to the jack 15-17 and the duct 20 being assigned to the jack 16-18. The ducts 19 and 20 are naturally equipped with closing and opening elements in order to permit admission and/or discharge of the fluid under pressure which serves to actuate the jacks. Similarly, the supply of fluid under pressure is effected through the junction box 11, the stem 12 and ports 21, 22 formed in the side walls of the cylinder 15 and ports 23, 24 formed in the wall of the cylinder 16. Finally, packing glands 25 provide a leaktight passageway for displacement of the stem 12 through the tool bodies 13 and 14.

Each tool body 13, 14 is fitted with retractable arms 26 each controlled by a small jack 27 which is supplied with fluid under pressure from its associated duct 19, 20. The retractable arms 26 are pivoted at one end to a fulcrum 31 and provided at the other end with runner-wheels 28 which are capable of rolling along the wall of the borehole. In the example shown in FIG. 2, each tool body 13, 14 has three arms 26 spaced at angular intervals of 120°. The vertical axis 29 of each tool body is displaced laterally with respect to the vertical axis 30 of the borehole 1.

Each measuring tool 13, 14 comprises one or a number of geophone assemblies 32 each mounted at one end of a rigid arm 33, the other end of which is attached to the tool body 13, 14. There is housed within each arm 33 a spring 34 which exerts a thrust on a shoe 35. A casing 37 which is rigidly mounted on said shoe 35 comprises an elastomer block 38 in which is inserted the base of a geophone assembly support 39. Three geophones 40 to 42 are mounted on the support 39 in three orthogonal directions in such a manner as to ensure that each geophone 40 to 42 can vibrate in one of these directions and thus detect the component of the vibration which propagates in its direction.

When the complete set of measuring mean, or so-called measuring string, is lowered into the borehole (as shown in FIG. 4), the lower tool 14, for example, is locked in position by radial extension of its arms 26 which are then applied against the borehole wall (see FIG. 4a), whereupon the geophone assemblies 32 are moved to the measurement position against the wall. The transmission means incorporated in the surface control unit 5 are then excited and transmit a signal into the ground and therefore around the borehole, the frequency of said signal being within the range of 5 to 500 Hz. The transmitted signal generates waves which propagate within the subsurface strata around the borehole. During this transmission stage, the geophone assemblies 32 of the lower measuring tool 14 are alone capable of detecting in the form of vibrational velocity the waves generated by the transmitted signal.

In fact, as soon as the measuring string is placed within the borehole 1, or in other words when the lower tool 14 is located at the level above which the geophysical measurements are to be performed, continuous winding of the cable 7 is initiated by the control means incorporated in the surface unit 5. Winding of the cable 7 is performed at a constant velocity V. In consequence, all the elements which are directly attached to said cable are displaced in uniform motion. This is the case with the traction means formed by the cable 7, the connection head 9 and the junction box 11. Since the stem 12 is rigidly fixed to the junction box 11, said stem is also displaced in the same uniform upward movement in the example illustrated. It follows as a consequence that the pistons 17 and 18 which are rigidly fixed on the stem 12 are also displaced in the same uniform movement at the constant velocity V.

In order to permit displacement of the piston 18 within the stationary cylinder 16, a communication is established between the uppper chamber 43 and lower chamber 44 defined by the piston 18 within the cylinder 16.

At the time of positional locking of the lower tool 14, the upper tool 13 is released by radial withdrawal of its arms to their position alongside the tool body (as shown in FIG. 4a) and fluid under pressure is admitted into the upper chamber 45 defined by the piston 17 within the cylinder 15 since the communication between said upper chamber and the lower chamber 46 of the cylinder 15 has been cut-off. The adequate pressure developed within the chamber 45 exerts an upward thrust on the cylinder 15 (as shown in FIG. 4b) and therefore in the direction of displacement of the traction means at an absolute velocity $|V'|$ which is higher than the absolute velocity $|V|$ of the piston 17. The value of V' is preferably double the value of V. At the end of its upward movement of travel (shown in FIG. 4c), the velocity of the cylinder 15 is reduced to zero. This corresponds to a position in which the tool 13 will in turn perform a series of geophysical measurements. To this end, its arms 26 are opened-out and the associated geophone assemblies 32 are brought into position against the wall of the borehole 1 since a communication has been established between the upper chamber 45 and the lower chamber 46.

The arms 26 of the lower measuring tool 14 are thereafter withdrawn (as shown in FIGS. 4c and 4d) and the cycle described earlier in connection with displacement of the upper tool 13 is repeated, but this time in the case of the lower tool (as shown in FIGS. 4c, 4d).

The successive cycles of upward displacement of the measuring tools 13 and 14 are repeated up to the full height of the borehole under investigation.

It is therefore apparent that a non-continuous movement of each tool 13, 14 corresponds to a continuous movement of the cable 7 and that the association of said tools makes it possible to perform a greater number of measurements within a shorter period of time.

In order that each geophone 40 to 42 of a given assembly may be capable of suitable vibration in the direction of the component of the detected vibrational velocity, it is necessary to ensure that this geophone is mechanically decoupled from the tool body 13, 14 which is associated therewith. In point of fact, the lowest characteristic elasticity s of the borehole wall 3 introduces an elastic coupling with the geophone or geophones 40 to 42. Since the elasticity S of the elastomer block 38 produces action on said geophones, an elastic system in equilibrium is therefore constituted by the tool body and the ancillary arms 26 having a total mass M, by the geophone assemblies 32 having a mass m, by the resilient means 34, 38 interposed between the tool body 13, 14 and the geophone assembly, and by the elasticity s of rock formations. In order to obtain good decoupling, it is accordingly necessary to determine an elasticity S which must be higher as the mass M is of greater value with respect to the mass m. Calculations show that, when S=s, the vibrational velocity of each geophone assembly is one-half the vibrational velocity of rock formations. In this case, it is necessary to ensure that the resonance frequency of the mass m with the elasticity S is equal to the resonance frequency of the mass m with the elasticity s.

Postulating a resonance frequency F equal to 100 Hz, the deflection under load of the resilient means is calculated from the formula $\rho = g/F^2 4\pi^2$ which is very little different from $1/4F^2$. Thus, when F=100 Hz, we obtain $\rho = 1/(4) \, 10^4 = 0.0025$ mm.

Resilient means which exhibit a deflection of this order can readily be formed of steel or of any elastic material such as neoprene.

It is clearly possible to adopt different ratios between S and s and other resonance frequencies provided that said frequencies are selected from the spectrum of frequencies emitted by the transmission means, that is to say in fact between 5 and 500 Hz.

In order to ensure that the geophone velocity is as close as possible to the compressional-wave velocity of the formation or rock structure and equal, for example, to 9/10 of the formation velocity, the value S=9 s may be adopted. In the case of a mass m equal to 0.1 kg, it is necessary to employ resilient means having a flexibility equal to 0.225 mm/Newton in respect of the value S=9 s.

As will readily be understood, the invention is not limited in any sense to the forms of construction hereinabove described by way of example and illustrated in the accompanying drawings. Depending on the applications envisaged, consideration may accordingly be given to any number of alternative forms of construction which remain within the capacity of those versed in the art without thereby departing either from the scope or the spirit of the invention.

From this it accordingly follows that, instead of integrating the jacks 15-17 and 16-18 in the tool bodies 13, 14, it is possible to construct a measuring string in which said jacks could be dissociated from the tool bodies. One example of construction would consist in connecting the junction box 11 to the cylinder of a first jack by means of a rigid stem and in connecting the operating rod of the jack to the body of the first upper tool. The cylinder of the second jack would be rigidly fixed to the upper tool body whilst the piston would be rigidly fixed to the second body of the lower tool. The operation of a system of this type would be similar to that described in the present specification since a non-continuous movement of the upper and lower tools would correspond to a continuous movement of the cylinder of the first jack.

Thus in an initial starting position, the piston of the first jack would be in a bottom position within its cylinder whereas the piston of the second jack would be in a top position within its cylinder. An admission of fluid under pressure into the second cylinder (upper chamber) would permit upward displacement of the upper tool whereas the lower tool would carry out the geophysical measurements. The second step would consist in locking the upper tool in position in order to perform the measurements and in admitting fluid under pressure into the lower chamber of the second jack, thus permitting displacement of the lower tool which would accordingly take up a new work position.

A further point to be noted is that, instead of using two jacks and two tools, it would be possible to use only one jack and one tool, the ranges of travel of the piston and of the cylinder being so determined as to permit the desired decoupling.

Throughout the foregoing description, consideration has been given to connections by means of electric conductors passed through the traction means and more specifically through the cable 7. Different means, however, could quite conceivably be adopted. Worthy of particular mention are those which consist of a telemetering transmitter of the radio type or ultrasonic type, for example. Said transmitter is incorporated in each geophone assembly and delivers a signal which is representative of each component of the wave received by each geophone. The signals delivered by the transmitters are picked up by one or a number of receivers placed within the junction box 11, for example, or within any other suitable element of the device which is interposed between the control means and one of the measuring tools. A design solution of this type makes it possible to dispense with the need to incorporate the electrical connections within the tool bodies.

We claim:

1. A device for making geophysical measurements within a wellbore comprising:
   drive means disposed at the ground surface;
   traction means within the wellbore and operatively connected to said drive means so that said drive means controls continuous displacement of said traction means within the wellbore;
   at least one double-acting jack having two moving portions, one of said moving portions being operatively associated with said traction means so that said one moving portion is displaced with said traction means, and the other of said moving poirtions is relatively movable with respect to said one moving portion so that said other of said moving portions is non-continuously displaceable with respect to said wellbore;
   at least one measuring tool operatively associated with said other of said moving portions so that said at least one measuring tool is displaceable with said other of said moving portions; and
   means for controlling the relative displacement between said two moving portions of said jack;
   so that said traction means is displaced in continuous motion with the speed of displacement controlled by said drive means, said double-acting jack is adapted to provide the measuring tool with a relative velocity which is equal and opposite to the absolute velocity of traction means for reducing the absolute velocity of the measuring tool to zero during measurement periods, and said measuring tool is provided between two consecutive measurement periods with a relative velocity which is in the same direction as the absolute velocity of said traction means so that the absolute velocity of said measuring tool is higher than the absolute velocity of said traction means.

2. A device as claimed in claim 1 wherein:
   said at least one measuring tool comprises a measuring tool body; and
   said jack comprises an integral part of said measuring tool body.

3. A device as claimed in claim 1, wherein:
   said device further comprises two measuring tools and two double-acting jacks, one of said jacks being interposed between said traction means and one of said measuring tools and the other jack being interposed between said two measuring tools.

4. A device as claimed in claim 3, wherein:
   each measuring tool comprises a measuring tool body; and
   each of said jacks is integrated in one of said measuring tool bodies.

5. A device as claimed in claim 1 and further comprising:
   transmission means capable of delivering transmission signals;
   at least one geophone mounted on resilient members which are connected to said at least one measuring tool for detecting acoustic waves generated by said transmission signals after propagation within subsurface strata which exhibit characteristic elasticity at the level of said geophone; and
   means for recording and processing electric signals delilvered by said geophone in response to the acoustic waves received thereby;
   said resilient members comprising means which are flexible in at least two directions and are interposed between said geophone and application means connected to said at least one measuring tool for applying said geophone against the borehole wall during each detection of said acoustic waves, said flexible means having an elasticity at least equal to the lowest elasticity of the subsurface stratum traversed by the borehole, and the mass of said geophone with the flexible means having a maximum frequency of resonance equal to the frequency of resonance of asid geophone mass with said lowest elasticity.

6. A device as claimed in claim 5, wherein:
   said flexible means comprise a spring which is flexible in three directions.

7. A device as claimed in claim 5, wherein:
   said at least one geophone comrpises three geophones mounted orthogonally with respect to each other for detecting acoustic waves which propagate in the directions of the geophones.

8. A device as claimed in claim 5, wherein said at least one measuring tool comprises:
- a tool body displaced off-center with respect to a substantially central axis of the borehole; and
- at least one retractable arm having a first end pivoted to said tool body and a second free end engageable against the borehole wall against which said geophone is applied.

9. A device as claimed in claim 5, wherein:
the resonance frequencies are within the limits of the frequency spectrum of said transmission means.

10. A device as claimed in claim 5, wherein:
said at least one measuring means comprises a tool body; and
said flexible means comprise a casing connected to said tool body by a rigid arm and three springs mounted in said casing arranged orthogonally with respect to each other.

11. A device as claimed in claim 5, wherein:
said at least one measuring means comprises a tool body; and
said flexible means comprise a casing connected to said tool body by a rigid arm and a block of elastomer mounted in said casing, said geophone being partly housed within said block.

12. A device as claimed in claim 11, and further comprising:
a telemetering transmitter for transmitting a signal which is representative of the component of the wave received by said geophone; and
a telemetering receiver placed within a receiving element interposed between said drive means and said at least one measuring tool.

13. A device as claimed in claim 12 wherein:
said telemetering transmitter comprises a radio-wave transmitter.

14. A device as claimed in claim 12 wherein:
said telemetering transmitter comprises an ultrasonic wave transmitter.

15. A method for making geophysical measurements within a wellbore of the type in which at least one measuring tool is displaced along the walls of said wellbore, said tool being connected to traction means, said method comprising the steps of:
- displacing said traction means in continuous motion with a speed of displacement controlled by drive means placed at the ground surface;
- displacing the at least one measuring tool with a relative velocity which is equal and opposite to the absolute velocity of the traction means in order to reduce the absolute velocity of the measuring tool to zero during measurement periods; and
- displacing said at least one measuring tool between two consecutive measurement periods at a relative velocity in the same direction as the absolute velocity of the traction means so that the absolute velocity of said at least one measuring tool is higher than the absolute velocity of said traction means.

16. A method according to claim 15, wherein:
the absolute velocity of the measuring tool is double the absolute velocity of the traction means between said measurement periods.

* * * * *